United States Patent Office 3,093,491
Patented June 11, 1963

3,093,491
METAL PROTECTIVE COATING COMPOSITION
Norman Bernard Larsen, Norristown, Pa., assignor to Corrosion Reaction Consultants, Inc., Philadelphia, Pa., a corporation of Pennsylvania
No Drawing. Filed May 5, 1960, Ser. No. 26,966
9 Claims. (Cl. 106—14)

The present invention is directed to a metal protective coating composition, and more particularly to a coating which may be applied to the surface of a metal, and which will protect the metal against corrosion, rust formation, and other adverse affects for extended periods of time.

The present invention has as an object the provision of a novel metal coating composition.

The present invention has as another object the provision of a metal protective coating composition which is durable and which has a strong affinity for metal surfaces and resists extended exposure under severe conditions, such as is encountered upon the application of the composition to the metal surfaces of salt water vessels.

Other objects will appear hereinafter.

The coating compositions of the present invention comprise a polymer formed from the reaction between a sorbitan mono fatty acid ester and an ester of stearic acid and an alcohol having from one to six carbon atoms, which has been polymerized in the presence of substantially pure zinc, and which contains a polar organic compound corrosion inhibitor. For application to a metal surface, the aforesaid protective coating composition should be dissolved in a solvent, with the preferred solvents comprising chlorinated solvents.

The weight ratio between the sorbitan mono fatty acid ester and the ester of stearic acid and an alcohol having from one to six carbon atoms is not critical, and may be varied over a wide range. For example, from one to six parts by weight of the sorbitan mono fatty acid ester may be utilized per part by weight of the ester of stearic acid and the alcohol having from one to six carbon atoms.

A wide variety of sorbitan mono fatty acid esters may be utilized, examples including sorbitan monolaurate; sorbitan monopalmitate; sorbitan monostearate; sorbitan monooleate; etc. Such materials may range from oily liquids through waxy solids.

The esters of stearic acid and an alcohol having from one to six carbon atoms include methyl stearate, ethyl stearate, propyl stearate, isopropyl stearate, butyl stearate, isobutyl stearate, amyl stearate, isoamyl stearate, hexyl stearate, etc.

A wide variety of polar organic compound corrosion inhibitors are now commercially available. Such corrosion inhibitors are soluble in organic bases and yet protect metals against corrosion and rust formation. Examples of polar organic corrosion compound inhibitors include the complex organic phosphate materials sold by Monsanto Chemical Company of St. Louis 24, Missouri, under the trademark "Santolene C." Other polar organic compound corrosion inhibitors include a wide variety of amine oxides, such as trimethylamine oxide; triethylamine oxide; tripropylamine oxide; methyldiethylamine oxide; ethyldimethylamine oxide; etc.

The concentration of the polar organic compound corrosion inhibitor in the compositions of the present invention is determined by the relative efficacy of the particular inhibitor.

The compositions of the present invention are prepared by refluxing the sorbitan mono fatty acid ester and the ester of stearic acid and an alcohol having from one to six carbon atoms, plus the polar organic compound corrosion inhibitor in a solvent in the presence of substantially pure zinc. A variety of solvents may be used for the refluxing. These include mineral spirits, mineral oil, mixtures of mineral oil and chlorinated solvents such as trichlorethylene, etc. The solvents may include blown oils, which remain in the finished metal protective coating composition. Examples of such blown oils include castor oil, linseed oil, rape oil, whale oil and fish oils.

After refluxing, the solvents should be boiled off, and the metal protective coating composition separated out. The metal protective coating composition is then dissolved in a chlorinated solvent such as chloroform, carbon tetrachloride, ethylene chloride, ethylidene chloride, etc.

It is absolutely essential for the purposes of the present invention that the polymerization between the sorbitan mono fatty acid ester and an ester of stearic acid and an alcohol having from one to six carbon atoms be effected in the presence of substantially pure zinc. A wide variety of other catalytic materials have been tested including alloys of zinc and copper, pure copper, lead, mixtures of zinc and lead, and without exception, the polymerization could not be effected unless the zinc catalyst was in the pure state.

In the following examples, the order of addition of the components is generally not critical.

Example I 141 parts by weight of trichlorethylene, 210 parts by weight of mineral spirits, 86 parts by weight of petroleum oil, 15 parts by weight of sorbitan monostearate, 8 parts by weight of a commercial polar organic compound corrosion inhibitor designated "Santolene C," and 5 parts by weight of butyl stearate are refluxed for ten minutes in a vessel whose bottom liner comprises pure zinc metal.

The volatile solvents were distilled off, and then 15 grams of raw linseed oil were added to the mixture while it was maintained at a temperature of 300° F. The mixture was then refluxed for two hours and allowed to cool.

The resin was removed from the mixture, and purified by resolubilization and precipitation utilizing trichlorethylene as a solvent.

The separated polymer had rubber-like characteristics and a high gloss. When dissolved in trichlorethylene and applied to a steel surface, it formed an exceedingly thin film which possessed excellent anti-corrosion and anti-rust characteristics. The film possessed an unusually high tenacity and affinity for its metal substrate, as could be demonstrated by the ability of the metal substrate to withstand continued exposure to heated salt water for extended periods without any adverse effect.

Example II

The procedure of Example I is duplicated except that in place of the Santolene C there is substituted trimethylamine oxide hydrate to the extent of ten parts by weight. The resultant composition likewise possessed superb anticorrosion and anti-rust characteristics.

Example III 15 parts by weight of sorbitan monooleate, 8 parts by weight of Santolene C and 5 parts by weight of butyl stearate were diluted with 40 parts by weight of naphtha. The mixture was placed into a vessel having a liner of pure zinc and the mixture was heated to 200° C. This temperature was maintained for a period of twenty-four hours. After eighteen hours, 30 parts by weight of blown linseed oil was added to the mixture.

The resin was separated from the vessel at the close of the twenty-four hour heating period, and when dissolved in trichlorethylene served as an excellent anti-corrosive and anti-rust agent when applied to metal surfaces.

Example IV

The procedure of Example III was repeated except that the liner instead of being pure zinc was a mixture of 75 weight percent zinc and 25 weight percent lead. No polymerization was obtained.

Example V

The procedure of Example III was repeated except that in place of the liner of pure zinc, there was substituted a mixture of 50 weight percent zinc and 50 weight percent copper. No polymerization was obtained.

Example VI

The procedure of Example III was repeated except that in place of the zinc liner there was substituted a liner of pure copper. No polymerization was obtained.

Example VII

The procedure of Example III was repeated except that in place of the Santolene C there was substituted triisopropylamine oxide and in place of the butyl stearate there was substituted amyl stearate. The resultant polymer compared favorably as a metal protective coating composition with the coating composition derived from Example III.

Example VIII

The procedure of Example VII was duplicated except that in place of the amyl stearate there was substituted stearic acid. No appreciable polymerization was obtained.

A wide variety of tests were conducted to determine if there was a critical ratio between the sorbitan mono fatty acid ester and the ester of stearic acid and an alcohol having from 1 to 6 carbon atoms. It was found that the relative proportions of these materials were not critical at least within the range of from 1 to 6 parts by weight of the sorbitan mono fatty acid ester to the ester of stearic acid and an alcohol having from 1 to 6 carbon atoms.

It was also determined that as long as the temperature of reaction was maintained at least at 300° F. for an appreciable period of time, the polymerization could be effected. Generally, the temperature range within 350° F. to 400° F. for a refluxing time of twenty-four to thirty-six hours gave the best results.

The resistance to corrosion achieved by the compositions of the present invention is exceedingly high. Employing the standard A.S.T.M. salt spray test, it has been determined that a thin film coating should give protection of upwards of several years to a metal substrate. I do not wish to be bound by any theory of operation, but it is my belief that the protective coatings of the present invention effectively isolate the metal substrates to which they are applied. Any penetration of the coating is apparently effectively defeated by the polar organic compound corrosion inhibitor which is uniformly dispersed in the coating, and which is available at any point of penetration.

The polymers of the present invention may serve as a vehicle for any organic compound corrosion inhibitor which is compatible therewith, and the concentration of such organic compound corrosion inhibitor will vary depending upon its nature and the use to which the metal protective coating composition is to be put. However, as above-indicated, the polymer of the subject invention has maximum utility in connection with polar organic compound corrosion inhibitors.

The present invention may be embodied in other specific forms without departing from the spirit or essential attributes thereof and, accordingly, reference should be made to the appended claims, rather than to the foregoing specification as indicating the scope of the invention.

It is claimed:

1. A metal protective coating composition consisting essentially of a solvent, a resin which is the reaction product of about 1 to 6 parts by weight of a sorbitan mono fatty acid ester per 1 part by weight of an ester of stearic acid and an alcohol having from 1 to 6 carbon atoms, and which contains intimately dispersed therewithin a compatible corrosion inhibitor.

2. A metal protective coating composition in accordance with claim 1 in which the corrosion inhibitor comprises a polar organic compound corrosion inhibitor.

3. A metal protective coating composition in accordance with claim 2 in which the corrosion inhibitor comprises a tertiary amine oxide.

4. A metal protective coating composition in accordance with claim 1 which includes a blown oil.

5. A resin consisting essentially of the reaction product of about 1 to 6 parts by weight of a sorbitan mono fatty acid ester per 1 part by weight of an ester of stearic acid and an alcohol having from 1 to 6 carbon atoms.

6. A method for forming a resin which comprises heating at a temperature of above 300° F. a mixture of about 1 to 6 parts by weight of a sorbitan mono fatty acid ester with 1 part by weight of an ester of stearic acid and an alcohol having from 1 to 6 carbon atoms in the presence of substantially pure zinc in a solvent to effect polymerization.

7. A method in accordance with claim 6 in which a compatible corrosion inhibitor is intimately dispersed throughout the mixture during its polymerization.

8. A method in accordance with claim 7 in which the compatible corrosion inhibitor is a polar organic compound corrosion inhibitor.

9. A method in accordance with claim 8 in which the polar organic compound corrosion inhibitor is a tertiary amine oxide.

References Cited in the file of this patent

UNITED STATES PATENTS

| | | |
|---|---|---|
| 2,558,025 | Wicks | June 26, 1951 |
| 2,891,089 | Jolly | June 16, 1959 |